3,224,965
WATER AND WASTE TREATMENT
Robert G. Woolery, Monroe, N.Y., assignor to Union Carbide Corporation, a corporation of New York
No Drawing. Filed Sept. 10, 1963, Ser. No. 307,781
7 Claims. (Cl. 210—24)

This invention relates to a process for removing undesirable suspended and colloidal solid matter from liquids, especially from aqueous liquids. More particularly, the invention relates to a process for clarifying water and removing solids from waste liquids by contacting such water and waste liquids with opened chrysotile asbestos.

Water that is to be used for human consumption, home cooking and the like desirably should be clear for aesthetic reasons as well as for health reasons. Colloidal and dispersed mineral and organic matter can affect the color, odor or taste of the water. Water that is to be used for industrial processes should be substantially free of colloidal and suspended mineral and organic matter. Such contaminating materials can form objectionable scale in boilers and process piping as well as undesirably color the water. Waste liquid effluents from municipal sewage treatment plants and industrial processes should desirably contain minimum amounts of suspended and colloidal solid matter.

It has now been found that aqueous liquids can be purified through removal of substantially all of any suspended and colloidal material by contacting such liquids with opened chrysotile asbestos. The suspended and colloidal material are retained by the asbestos and the so-purified aqueous liquid can then be easily separated from the asbestos. The term "opened" refers to asbestos that has been at least partially broken up into individual asbestos fibrils or small clusters of fibrils. Such opening can be accomplished by mechanical means, such as a hammer mill. It is preferred that the opened asbestos employed in the present invention be in the short fiber form having certain distinctive characteristics. This preferred distinctive chrysotile asbestos, which for purposes of convenience will hereafter be referred to as "Coalinga-type" asbestos, has the following properties in the dry form wherein the values are measured on chrysotile asbestos that has been opened, for example, by one pass through a laboratory size Mikropulverizer employing a screen with 0.046-in. slots.

TABLE I

| | Prior Art Chrysotile Asbestos | Coalinga-Type Asbestos |
|---|---|---|
| Water Retention (gm. water/gm. asbestos) | 1.6–1.7 | 2.1–2.2 |
| Oil Adsorption (gm. DOP/gm. asbestos) | 0.4–0.5 | 0.8–0.9 |
| Specific Surface Area (m.²/gm.) | 10–50 | 60–80 |

The asbestos material preferred in the present invention is obtained from a deposit located near Coalinga, California. This is a newly found deposit believed to be the largest single asbestos deposit in the world. Asbestos mined at this location is short fibered chrysotile asbestos and would be classified between grade 5 and grade 7 according to the Canadian Standards Classification. Coalinga asbestos, however, has a much more uniform distribution of individual fiber lengths and diameters than do comparable grades of Canadian chrysotile asbestos. In addition, the surface area of Coalinga asbestos is substantially greater than that of any other type of asbestos. As can be seen from the above table, refined asbestos obtained from the Coalinga deposit has properties which are substantially different from any prior art asbestos.

While not wishing to be limited to the geographic deposit at Coalinga, California, the type of asbestos recovered from ore such as found there is preferred in the present invention. This type of asbestos, i.e. having the properties shown in Table I above, is intended wherever the term "Coalinga-type" asbestos is used throughout the disclosure.

WATER RETENTION

The water retention of the chrysotile asbestos is determined by taking 20 grams of dry opened chrysotile asbestos fiber, slurrying the fiber in 500 ml. of water and pouring the slurry onto a Buchner funnel provided with a disc of filter paper 6 inches in diameter. The slurry is then filtered through the filter paper while maintaining a reduced pressure of 27 inches of mercury below the filter paper until the filtrate flowing from the stem of the Buchner funnel changes from a solid stream to dropwise flow. The wet asbestos filter cake and filter paper are then weighed. The tare weight of dry asbestos and dry filter paper is then subtracted therefrom to compute the weight of water retained per 20 grams of asbestos. Distinctive Coalinga-type chrysotile asbestos useful in the present invention must have a water retention of greater than about 34 grams of water per 20 grams of asbestos or greater than about 1.7 grams of water per gram of asbestos.

OIL ADSORPTION

A 5 gram sample of dry opened chrysotile asbestos is placed in a 500 ml. mortar. Di-octyl phthalate (DOP) is added dropwise from a graduated burette to the asbestos in the mortar. The resulting mixture is ground between the mortar and a pestle until sufficient DOP has been added to cause formation of a paste that adheres to the pestle. The end point is taken at the time when all of the asbestos-DOP mixture adheres to the pestle. Distinctive Coalinga-type chrysotile asbestos useful in the present invention must have an oil adsorption greater than about 1.4 milliliters DOP per gram of asbestos (greater than 0.7 grams DOP per gram of asbestos).

SPECIFIC SURFACE AREA

The specific surface area of the dry opened asbestos is measured conveniently by the Brunauer-Emmett-Teller (BET) method, using nitrogen. A sample of convenient size, such as 1–5 grams, is heated to about 250° C. under pressure of less than 1 micron mercury for about 16 hours to drive off adsorbed gases and moisture. The sample in its evacuated condition is then cooled to liquid nitrogen temperature. A measured amount of nitrogen gas is admitted to the sample chamber and the system allowed to come to equilibrium. The remaining gas is determined from temperature and pressure measurements. The difference is the amount of nitrogen adsorbed by the sample. This is repeated at several adsorption pressures in order to obtain an isotherm. The isotherm data are then plotted and the surface area of the sample calculated by well known techniques. This method is further described in "Physical Methods and Chemical Analyses," W. G. Berl, vol. 2, pp. 278, 301 (1951), Academic Press, New York. Distinctive Coalinga-type chrysotile asbestos useful in the present invention must have a specific surface area greater than about 35 square meters per gram.

The distinctive Coalinga-type chrysotile asbestos useful in the present invention can be obtained in various ways. In general, bulk chrysotile asbestos can be broken up mechanically and then separated by well known classification techniques into a fraction having the above desired characteristics. Such classification can take place in dry processing procedures employing gases to aid in separation or in wet processing procedures employing liquids to aid in separation. If desired, asbestos dispersion techniques may also be employed. Such dispersion techniques are described, for example, in British Patent No. 562,161 relating to mechanical wet dispersion and U.S. Patent Nos. 1,607,616; 2,626,213; 2,652,325 and 2,661,287 relating to chemical wet dispersion. Chrysotile asbestos obtained from various raw material locations are useful in the present invention as long as the asbestos has the preferred distinctive properties. Typical short-fiber chrysotile asbestos per se does not have the above preferred distinctive properties. Asbestos obtained from deposits located near Coalinga, California is especially useful in the present invention because such deposits contain a high proportion of short-fiber chrysotile asbestos having the preferred distinctive properties.

This invention can be employed to remove particulate solids from aqueous solutions as well as remove organics, oils and non-biologically digestible material. The latter contaminant is a special problem for waste treatment. Municipal sewage and waste treatment processes, as well as the natural purifying action of streams and lakes, rely to a great extent on biological degradation of contaminating material into non-harmful forms. Certain surface-active materials and other chemicals used for domestic and industrial applications are not biologically digestible and their presence in waste effluents can seriously harm the biological balance of streams and lakes as well as create a health hazard. Asbestos has been found useful to reduce the amount of non-biologically digestible material in aqueous liquids. Asbestos can also neutralize dilute acids which may be present.

While not intending to be limited thereby, it is believed that the asbestos purifies the aqueous liquids in the following manner. The electropositive surface charge on the asbestos fibrils attracts the generally electronegatively charged suspended and colloidal solid matter and thus withdraws such matter from the liquid. The high absorbency aids in removing oils and other organics, including non-biologically digestible material. The normally alkaline nature of asbestos aids in neutralizing dilute acids. The asbestos fibrils also can have a filtering action on the liquid to further aid in solids removal.

The process of the present invention can be carried out in various ways. The liquid to be treated can be passed through a bed of opened asbestos to form a purified effluent leaving the contaminants behind in the asbestos bed. Alternatively, the liquid to be treated could be mixed with opened asbestos and the purified liquid separated from the asbestos by filtration, by settling and decantation, or by flotation removal of the asbestos. The asbestos purification process can be used alone to treat aqueous liquids or it can be used in conjunction with other purification treatments. For example, alum can be used to coagulate suspended matter and then the asbestos can be used to remove last traces of suspended matter plus organics from the supernatant liquid. The asbestos can also be used in admixture with flocculating agents, such as alum. Asbestos can also be used either as a pretreatment or post-treatment for activated sludge sewage and waste treatment processes. The amount of asbestos necessary to carry out the present process is not critical. It is preferred that the asbestos be present in an amount sufficient to remove substantially all suspended and colloidal matter from a given amount of aqueous liquid to be treated. Such amounts of asbestos can be readily determined by one skilled in the art of water clarification and waste treatment.

The invention is described in more detail with respect to the following examples.

*Example 1*

Water clarification was carried out in a 500 ml. glass beaker in which 200 ml. of tap water was added. The tap water had a turbidity of 40 as determined by an Aminco light scattering photometer. This value corresponds to the constant "k" in the equation: $I/I_0=e^{kl}$ where $I_0$=initial light intensity, $I$=light intensity after passing a distance "$l$" through a liquid. To this tap water was added 15 ml. of a water dispersion of asbestos containing 0.1 weight percent asbestos (about 0.015 gram) having the above-described distinctive characteristics. This asbestos dispersion was obtained by agitation of a water-asbestos mixture containing $1 \times 10^{-4}$ gram moles of $FeCl_3$ per gram of asbestos, such mixture having a pH of 2.5 to 5. The asbestos dispersion and tap water were stirred together for 5 minutes at 25° C. Sodium carbonate was then added in an amount to raise the pH to a value greater than 7 which caused flocculation of the asbestos. The tap water was then separated from the asbestos by gravity filtration. The filtrate had a turbidity of 15 as measured by the above method. A blank was run on the turbidity before and after filtering and sodium carbonate addition and no change in turbidity was noted.

*Example 2*

Colloidal silica was added to 200 ml. of water until the turbidity as measured by an Aminco photometer was 470. To this mixture was added 0.015 gram of dispersed asbestos prepared in the manner described in Example 1 above. Additional $FeCl_3$ was added to the mixture to form a 0.0005 molar solution. The $FeCl_3$ tends to increase the electropositive charge on the surface of the asbestos. The resulting mixture was slowly stirred for five minutes and the pH adjusted between 7 and 8 by addition of sodium carbonate. The resulting mixture was allowed to stand for five minutes and then filtered through No. 41 grade filter paper. The filtrate had a turbidity of 10. A blank was run on the turbidity before and after sodium carbonate addition plus filtration and the turbidity decreased slightly from 470 to 430.

*Example 3*

Powdered kaolin clay was added to 200 ml. of water until the turbidity was 1980 as measured by Aminco photometer. To this suspension was added 0.015 gram of dispersed asbestos prepared in the manner described in Example 1 above. The resulting mixture was stirred and the pH adjusted to a value above 7 by the addition of sodium carbonate solution. The resulting mixture was then filtered by gravity through No. 41 grade filter paper. The filtrate had a turbidity of 17. A blank was run on the turbidity before and after sodium carbonate addition plus filtration and the turbidity decreased slightly from 1980 to 1870.

The above examples clearly show that opened asbestos, and especially dispersed asbestos having distinctive characteristics, can remove substantially all suspended and colloidal particulate matter from cloudy water.

The present invention is also useful for purifying industrial wastes, such as aqueous effluents from chemical and food processing plants. It can also be used for clean-up of the "white-water" from paper mills. A dispersion of distinctive asbestos in water having a 2 weight percent asbestos solids content was used to treat industrial wastes. Asbestos in amounts of at least about 30 p.p.m. (parts by weight asbestos per million parts by weight waste liquid) substantially reduced the suspended solids content of the waste liquids. When used in combination with other treating materials, such as alum, the suspended solids content of waste liquids was reduced about 75 percent.

The following example describes use of asbestos in combination with flocculating agents, such as organic flocculating agents, for the purification of aqueous industrial wastes. Flocculating agents useful with asbestos are well known in the art and are exemplified by alum, polyacrylamide and the like.

*Example 4*

One liter of aqueous furnace dust slime from a steel mill containing about 3500 p.p.m. solids (solids parts per million parts of liquid by weight) was placed in a one liter cylinder. The aqueous industrial waste was agitated with a plunger. During agitation 2 p.p.m. (parts by weight per million parts by weight of aqueous industrial waste) of Separan 2610, a polyacrylamide flocculating agent marketed by The Dow Chemical Co., was added followed by 50 p.p.m. of opened chemically dispersed asbestos (parts asbestos per million parts of industrial waste by weight). The asbestos was added in the form of an asbestos-water slurry containing 10 grams of dry opened distinctive asbestos per liter of slurry. Agitation was continued for one minute. The treated industrial waste was allowed to stand without agitation for 20 minutes. The supernatant clear liquid was decanted and its light transmission properties were measured by well known techniques. Using the light transmission of distilled water as a standard of 100 percent, the clear liquid obtained above had a light transmission of 94.5 percent. If untreated furnace dust slime is allowed to settle for 20 minutes, the supernatant liquid has a light transmission of only about 28 percent. This clearly shows the improved clarification that is obtained by the combination of asbestos and a flocculating agent. Such clarification is an improvement over the results obtained by either asbestos or flocculating agent used alone. The asbestos also results in flocculated material which is more stable and more resistant to dispersion by agitation than that obtained by prior art flocculating agents without the presence of opened chrysotile asbestos.

The above examples all employed opened chrysotile asbestos that has been chemically dispersed in water suspension. It should be understood that other forms of opened chrysotile asbestos which have not been chemically dispersed are also useful in the present invention.

What is claimed is:

1. A process for removing suspended and colloidal matter from aqueous liquids which comprises contacting an impure aqueous liquid with a flocculating agent and opened Coalinga-type chrysotile asbestos to flocculate and retain the suspended and colloidal matter, wherein said asbestos is characterized in the dry form by a specific surface area greater than 60 square meters per gram, a water retention greater than 1.7 grams of water per gram of asbestos, and an oil adsorption greater than 0.7 gram of dioctyl phthalate per gram of asbestos, and then separating the asbestos, flocculating agent and retained matter from the so-purified aqueous liquid.

2. A process as claimed in claim 1 wherein the flocculating agent is alum.

3. A process as claimed in claim 1 wherein the flocculating agent is polyacrylamide.

4. A process for purifying an aqueous liquid by removing suspended and colloidal matter therefrom which comprises contacting an impure aqueous liquid containing suspended and colloidal matter selected from the class consisting of mineral and organic materials with chrysotile asbestos characterized by a specific surface area greater than 60 m.$^2$/gm., a water retention greater than 1.7 grams of water per gram of asbestos, and an oil adsorption greater than 0.7 gram of dioctyl phthalate per gram of asbestos, whereby the suspended and colloidal matter are retained by said asbestos, and then separating said asbestos and retained matter from the so-purified aqueous liquid.

5. A process for purifying an aqueous liquid by removing suspended and colloidal matter therefrom which comprises contacting an impure aqueous liquid containing suspended and colloidal matter selected from the class consisting of mineral and organic materials with opened Coalinga-type chrysotile asbestos characterized by a specific surface area greater than 60 m.$^2$/gm., a water retention greater than 1.7 grams of water per gram of asbestos, and an oil adsorption greater than 0.7 gram of dioctyl phthalate per gram of asbestos, whereby the suspended and colloidal matter are retained by said asbestos, and then separating said asbestos and retained matter from the so-purified aqueous liquid.

6. A process as claimed in claim 4 wherein the impure aqueous liquid has a cloudy appearance.

7. A process as claimed in claim 5 wherein the impure aqueous liquid has a cloudy appearance.

References Cited by the Examiner

UNITED STATES PATENTS

| | | | |
|---|---|---|---|
| 1,364,387 | 1/1921 | Landreth | 210—42 |
| 2,158,954 | 5/1939 | Zigerli | 210—17 |
| 2,593,125 | 4/1952 | Eaton et al. | 252—315 |
| 2,661,287 | 12/1953 | Barbaras | 252—313 |

OTHER REFERENCES

Dow: Separan 2610 in Waste and Sewage Treatment, a publication of The Dow Chemical Co., Midland, Mich., October 1956, 16 pp. and 7 additional pp. appendix, pp. 1–5 and 13 particularly relied on.

Liu: Asbestos as Filter Aid in Sugar Refining, Ind. and Eng. Chem., vol. 38, May 1946, pp. 521–524.

Pundsack: The Properties of Asbestos, J. Phys. Chem., vol. 59 (1955), pp. 892–895.

Rosato: Asbestos, Its Industrial Applications, 1959, Reinhold, New York, pp. 41 and 185 relied on.

MORRIS O. WOLK, *Primary Examiner.*